United States Patent [19]

Baier et al.

[11] Patent Number: 4,505,356
[45] Date of Patent: Mar. 19, 1985

[54] OPERATOR'S SEAT AND CONTROLS ARRANGEMENT FOR A TANDEM ROAD ROLLER

[75] Inventors: Heinrich Baier, Willich; Hans-Georg Waschulewski, Mettmann; Hans-Werner Kürten, Ratingen, all of Fed. Rep. of Germany

[73] Assignee: Losenhausen Maschinenbau AG., Dusseldorf, Fed. Rep. of Germany

[21] Appl. No.: 470,939

[22] Filed: Mar. 1, 1983

[30] Foreign Application Priority Data

Mar. 19, 1982 [EP] European Pat. Off. ........ 82102247.2

[51] Int. Cl.³ ............................................. B60K 26/00
[52] U.S. Cl. ...................................... 180/322; 180/20; 180/326; 404/122
[58] Field of Search ............... 180/321, 322, 323, 326, 180/329, 330, 334, 20; 404/117, 122, 123, 126

[56] References Cited

U.S. PATENT DOCUMENTS

| | | | |
|---|---|---|---|
| 2,827,715 | 3/1958 | Wagner | 180/330 |
| 3,060,818 | 10/1962 | Roberts | 180/20 |
| 3,868,194 | 2/1975 | Ferguson et al. | 404/126 |
| 4,310,261 | 1/1982 | Opderbeck | 180/20 |

FOREIGN PATENT DOCUMENTS

| | | | |
|---|---|---|---|
| 471344 | 2/1929 | Fed. Rep. of Germany | 180/334 |
| 2748074 | 5/1978 | Fed. Rep. of Germany | 180/321 |
| 1143746 | 10/1957 | France | 180/323 |

Primary Examiner—Joseph F. Peters, Jr.
Assistant Examiner—Kenneth R. Rice
Attorney, Agent, or Firm—Lee, Smith & Zickert

[57] ABSTRACT

An ergonomically advantageous operator's seat and controls arrangement for tandem road rollers comprises on the transverse center line of an operator's platform operator's seats arranged side by side and rotatable about vertical axes. A control stick pivotable in two mutually orthogonal directions is located on the longitudinal center line of the operator's platform in the middle between the operator's seats. Two steering devices are mounted with their steering columns rotatable about a longitudinal, central axis on two opposite transverse sides of the platform. Thus by rotation of the seats through 180°, four possible seat positions for the operator are achieved. By pivoting the control stick towards the respective occupied seat and by corresponding rotation of one steering device to in front of this seat, all controls are always within easy reach of the operator. A step-down device is provided between the control stick and speed control means to permit sensitive adjustment of the travelling speed of the tandem road roller in low speed ranges.

14 Claims, 6 Drawing Figures

OPERATOR'S SEAT AND CONTROLS ARRANGEMENT FOR A TANDEM ROAD ROLLER

The invention relates to an operator's seat and controls arrangement for a tandem road roller with roller barrels comprising an operator's platform with two operator's seats, two steering devices and a control stick.

A prior operator's seat and controls arrangement for a tandem road roller comprises a cabin having rectangular basis and is provided with two operator's seats fixedly arranged in diagonally opposite corners. Each of said seats has associated therewith a steering device and a control stick. The control sticks are located laterally outwards from the respective steering devices (Model DV 10B, Hamm). This tandem road roller can be driven in two operative directions for edge and seam work. With the described equipment, however, backward travel in the same track is permitted only with the operator in a very uncomfortable attitude.

Other operator's seat and controls arrangements for tandem road rollers are known (for example LOSENHAUSEN Models W551 and W 751), in which the operator, during edge and seam work, can be seated with normal attitude, with one direction of travel only.

During operation of such tandem road rollers, in particular when compacting edges and seams, it is necessary that the operator is able to see the barrel edges at the location of the contact line between barrel and underground. With tandem road rollers having an operational weight of 6t and more, the operator's seats must have such a large lateral distance that the common controls on the transverse side of the operator's platform are no longer within easy reach from both seats. Equivalent seating facilities for both directions of travel can then be achieved only by doubling the equipment. The arrangement of the four seating facilities and the change of the operator's position therebetween requires much space, which in general is not available, at least in tandem road rollers of an operative weight of up to 12t. Therefore the prior art road rollers are provided with operator's seats which, though they require little space, as desired, do not permit, however, the operator to make full use of all available technical operational facilities, or, at least, do so with substantial difficulties only.

It is the object of the invention to provide an operator's seat and controls arrangement for a tandem road roller, which requires a minimum of equipment and is ergonomically equally favorable for the operator in all operational positions required for the operation of the tandem road roller.

According to the invention this object is achieved in that (a) the operator's seats are mounted side by side for rotation about vertical axes of rotation substantially on the transverse center line of the operator's platform and in the plane of the respective barrel edges, (b) the steering devices are mounted on opposite transverse sides of the driver's platform substantially on the longitudinal center plane of the operator's platform and pivotable about an axis extending in said center plane, and (c) said control stick is arranged in the middle between the operator's seats.

With the arrangement of the invention, the steering device and the control stick are always within easy reach of the operator, regardless of the direction of travel of the tandem road roller. The operator has, at any moment, good view on the working area of the tandem road roller. This good view is ensured on both sides of the arrangement and for both directions of travel.

In a preferred embodiment, the steering device comprises a steering wheel and a steering column through which the steering wheel is in driving connection with a steering shaft and a hydraulic steering booster. The steering column has a pivot sleeve at its end remote from the steering wheel. This pivot sleeve is rotatable against the action of self-locking means and is arranged to be locked in a center position and in least two lateral positions.

A control stick is mounted on a pivot device permitting pivoting of the control stick in two mutually orthogonal directions. Thus the operator may pull the central control stick in transverse direction towards the seat just occupied by the operator.

The control stick is operatively connected with speed control means through an adjustable step-down device. This permits adjustment of the speed range of the travel of the tandem road roller in accordance with the requirements, without altering the angular range of the control stick. Thus highly sensitive and bump-free control of the travel speed, the acceleration and of the deceleration is permitted in particular in the lower speed range.

Further details of the invention have been claimed in the sub-claims.

An embodiment of the invention is described in greater detail hereinbelow with reference to the accompanying drawings.

Figure 1:
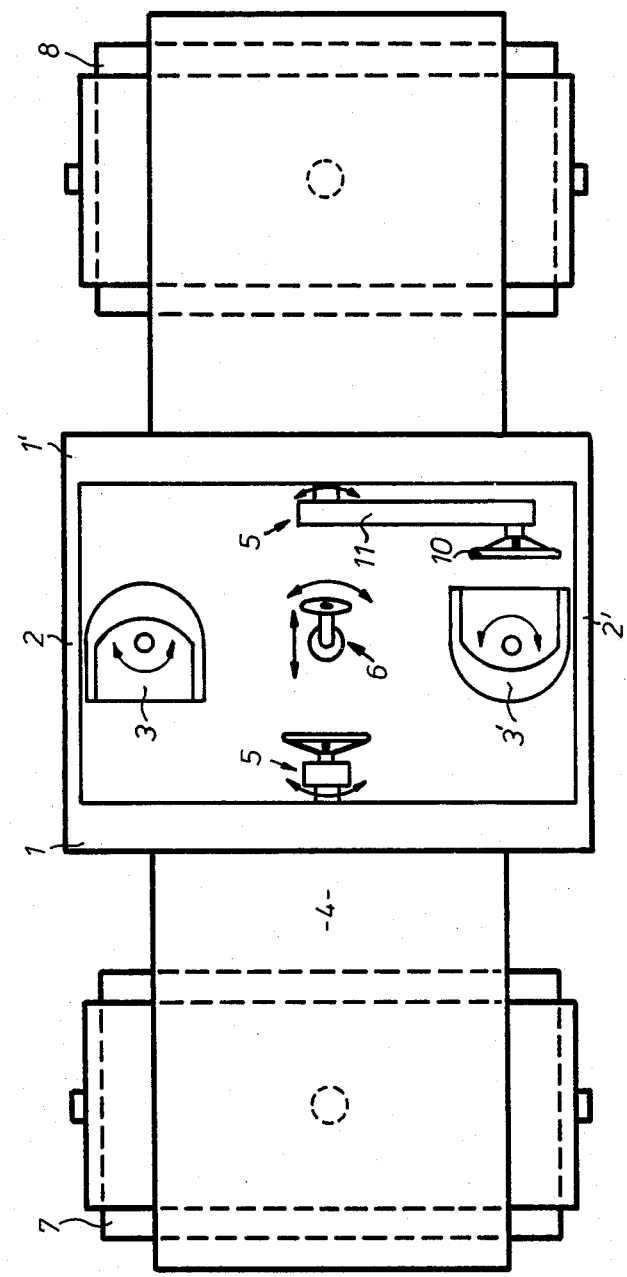
FIG. 1 is a schematic plan view of an operator's seat and controls arrangement on a tandem road roller.

In the schematic plan view of FIG. 1 there is an operator's platform, which may be provided with a closed cabin, having transverse sides 1,1' and longitudinal sides 2,2'. This operator's platform is part of a tandem road roller having a frame 4 and two roller barrels 7,8. The operator's platform carries two operator's seats 3,3' which are arranged side by side on the transverse center line of the operator's platform, and are rotatable about vertical axes. The arrangement is such that the planes of the lateral edges of the roller barrel 7,8 intersect the operator's seats 3,3', respectively, whereby the operator is able to see the roller barrel edge in the area of the line of contact between roller barrel and ground, with each direction of travel from his normal seated position. Two steering devices 5 are provided on opposite transverse sides of the operator's platform. They are arranged in the longitudinal center plane of the operator's platform and pivotable about an axis extending in this center plane. Thus the respective desired steering device 5 can be moved to the operator's seat occupied by the operator. The control stick 6 for controlling the travelling speed of the tandem road roller is arranged in the middle between the operator's seats 3,3'.

Figure 2:
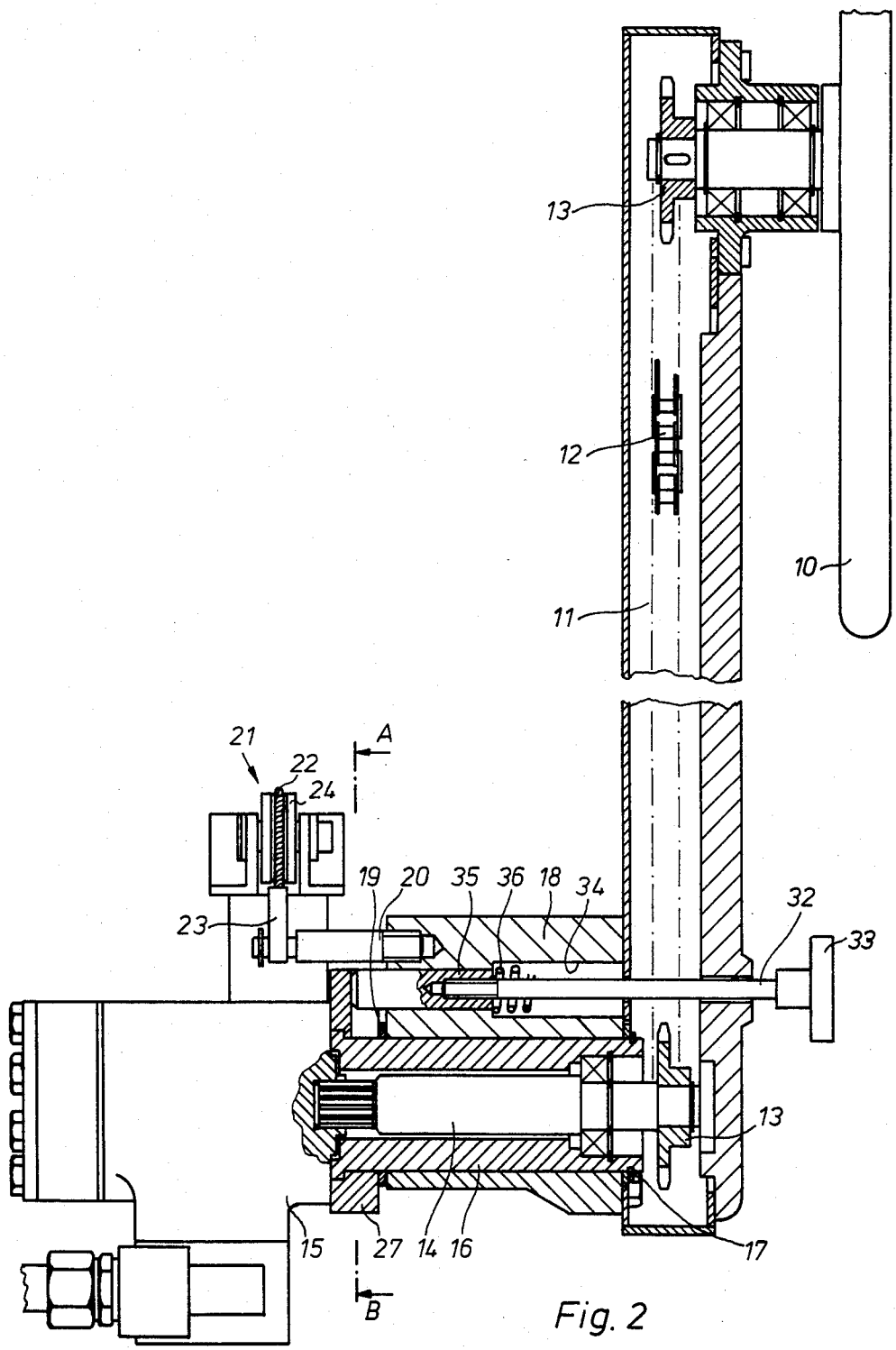
FIG. 2 is a longitudinal sectional view of the steering device in a tandem road roller of FIG. 1.
Figure 3:
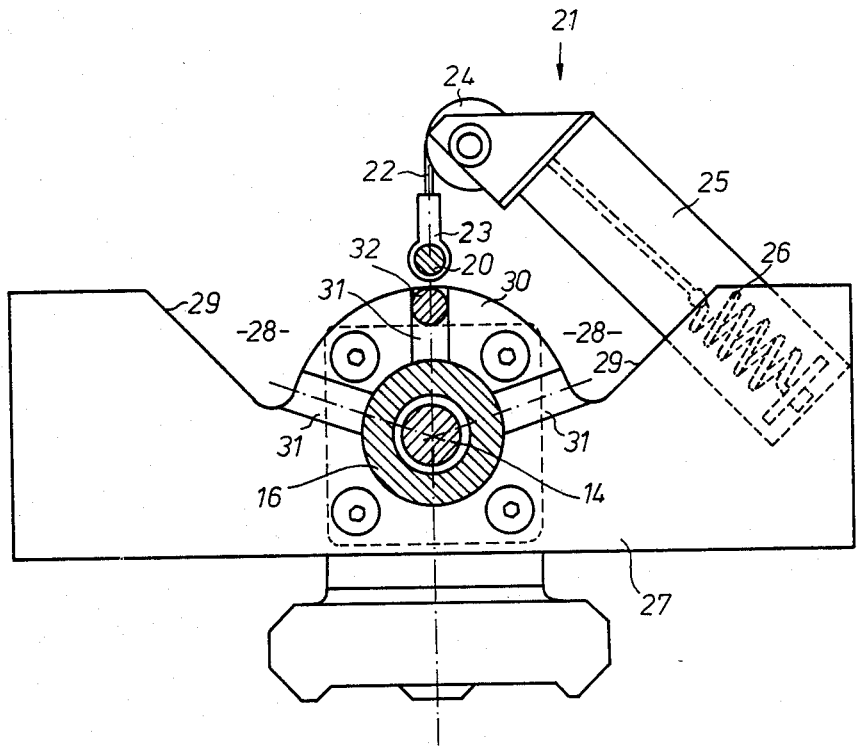
FIG. 3 is a sectional view of the steering device taken along line A–B of FIG. 2.

The steering device 5 is shown in detail in FIGS. 2 and 3. It comprises a steering wheel 10 which is rotatably mounted at one end of a steering column 11 on the side facing the operator, and which is in driving connection with a steering shaft 14 through a chain 12, which extends within the steering column 14. The steering shaft 14 is connected to a hydraulic steering booster 15, which is of conventional construction and therefore is not described in detail. The steering shaft 14 is mounted in a bushing 16, one end of which is affixed to the transverse side 1 of the operator's platform through a holding plate 27 to be described hereinbelow. The other end of bushing 16 is inserted into a corresponding aperture in the end of the steering column 11 remote from the steering wheel, and is held against axial displacement by a retainer ring 17. The bushing 16 and the steering shaft 14 are arranged eccentrically in a pivot sleeve 18, which has one end face bolted to the end of the steering column 14 remote from the steering wheel, and is held against axial displacement by a further retainer ring 19 at the other end. The pivot sleeve 18 extends only over part of the length of the bushing 16. A bolt 20 is set-in into the end face of the sleeve remote from the steering column 11. Self-centering means 21 engage the free end of bolt 20. The self-centering means comprises a cable 22, one end of which is affixed to the free end of the bolt 20 through an eye 23, and the other end of which passes over a deflection roller 24 into a spring housing 25 and there is connected to a tensioning spring 26.

FIG. 3 shows the generally rectangular holding plate 27 which is affixed to the end face of the bushing 16 remote from the steering column 11, and to the transverse side 1 of the operator's platform. The steering shaft 14 and the end of the bushing 16 extend through an aperture in the middle of the holding plate 27. On its side facing the pivot sleeve 18, the holding plate 27 is provided with a recess 28 having lateral edges 29. A nearly semicircular, arcuate projection 30 extends into the recess 28 and extends around the end of the bushing 16. The projection 30 is aligned with the pivot sleeve 18 and is separated therefrom merely by the retainer ring 19. Three radially extending grooves 31 are provided in the holding plate 27 on the side facing the pivot sleeve 18. The median one of these grooves 31 extends vertically upwards, and two other grooves extend at an angle from 60° to 70° towards opposite sides. A locking bolt 32 having an actuating knob 33 at its free end extends through apertures in the steering column 11 and into another bore section in a stepped bore 34, which passes through the pivot sleeve 18 parallel to the steering shaft 18. A narrow bore section in a stepped bore 34 accommodates an enlarged portion 35 of the locking bolt 32. The enlarged portion 35 extends through the stepped bore 34 of the pivot sleeve 18, and its diameter is adapted to the width of the grooves 31 in the holding plate 27. A locking spring 36 received in the enlarged bore section of the stepped bore 34 engages the enlarged portion 35.

The steering device 5 described hereinbefore is shown in FIG. 2 with vertical position of the steering column 11, the locking bolt 32 engaging the median groove 31 of the holding plate 27. To rotate the steering column 11 the locking bolt 32 is pulled out of the groove 31 by means of the actuating knob 33 and against the action of the locking spring 36. Then the steering column 11 can be rotated clockwise or counterclockwise. The pivot sleeve 18 is taken along and is rotated on the bushing 16 about the steering shaft 14. The spring loaded cable 22 acts to make this rotary movement self-centering. The rotary movement is limited by engagement of the bolt 20 with the lateral edges 29 of the holding plate 27. When the actuating knob 33 is released, after the steering device has been rotated in its desired position, the locking bolt 32 engages the respective selected groove 31 in the holding plate 27 under the action of the locking spring 36. Thereby the steering column 11 is retained in its lateral position, in which it is required for the control of the road roller travel during edge work.

Figure 4:
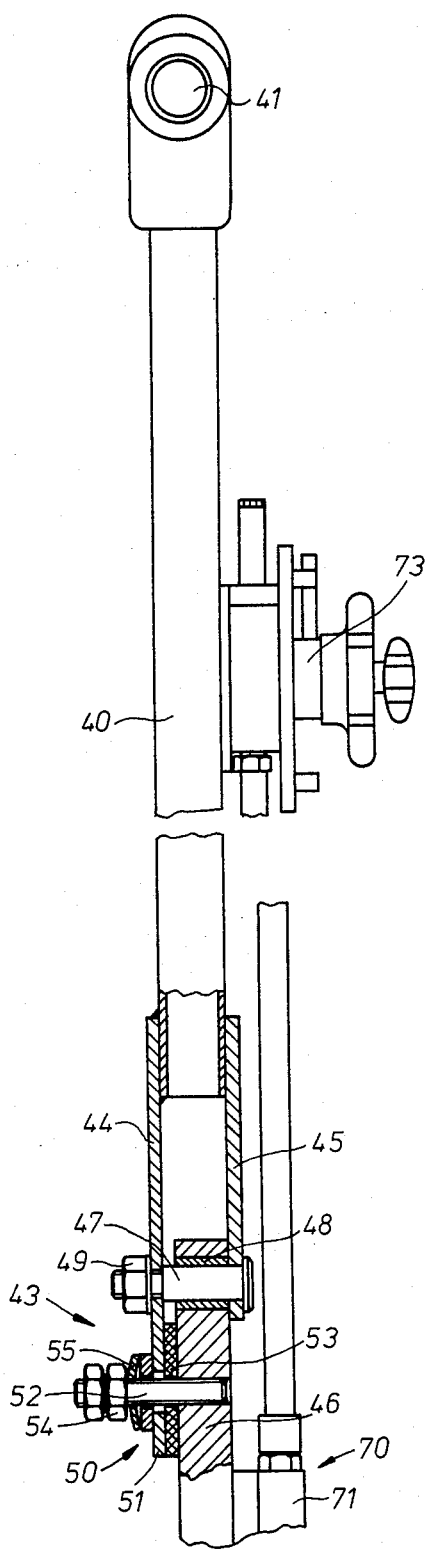
FIG. 4 is a partially sectional partial view of the control stick of the tandem road roller of FIG. 1.
Figure 5:
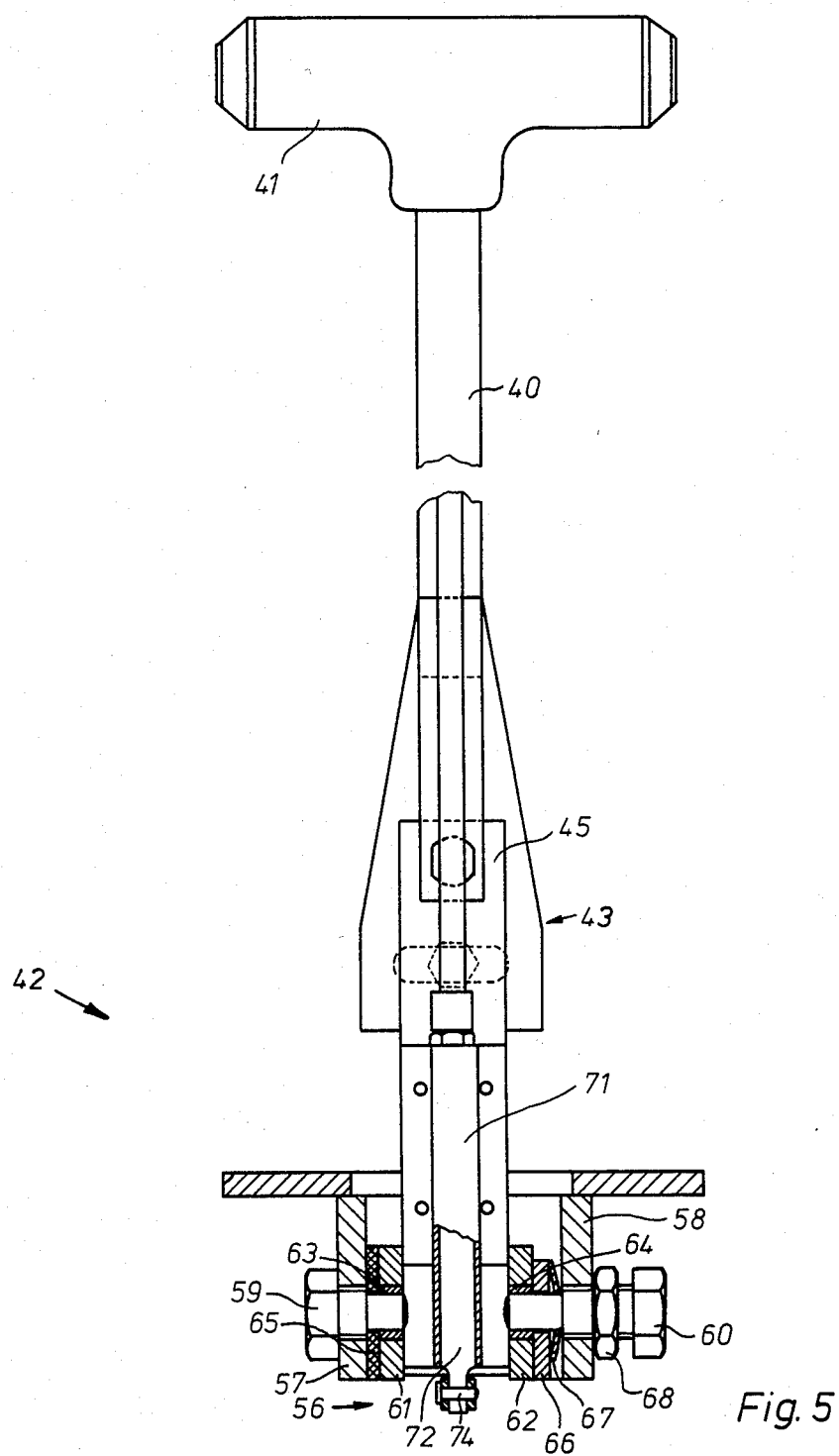
FIG. 5 is a partially sectional view of the pivot bearing of the control stick of FIG. 4

The control stick 6 illustrated in detail in FIGS. 4 and 5 comprises an upper portion 40, which carries a conventional actuating element 41 for a vibrating device of the tandem road roller, and a pivot device 42, which permits pivotal movement of the control stick 6 in two mutually perpendicular directions. The pivot device 42 comprises a first arm 46 for rotating the control stick about an axis parallel to the transverse axis of the tandem road roller, and a second arm 43 for rotating the control stick about an axis parallel to the longitudinal axis of the road roller. The second arm 43 comprises two plates 44,45, with which the upper portion 40 is connected firmly, for example by welding, at its end remote from the actuating element 41. At their ends remote from the upper portion 40, the two plates 44,45 are pivotably mounted on a first end of the first arm 46 about an axis parallel to the longitudinal axis of the tandem road roller. This is achieved by means of a pivot bolt 47, which extends through the plates 44,45 and a sliding bearing 48 set-in into the first end of the first arm 46, and is secured by a nut 49. Self-locking means 50 for the rotary movement of the second arm 43 in the sliding bearing 48 are formed on a projecting portion 51 of the plate 44 and consist substantially of a bolt 52, which is screwed into a threaded bore in the first end of the first arm 46 through an aperture in the projecting portion 51 and a low-wear friction disc 53. A cup spring 55 tensioned by nuts 54 engage the projecting portion 51 through a washer, and thereby restrains the second arm against unintentional rotary movements relative to the first arm 46 and thus restrains the control stick 6 against unintentional rotary movements about the axis parallel to the longitudinal axis of the tandem road roller.

The first arm 46 is a square bar and extends through an opening in the bottom of the operator's platform. Its second end is mounted for rotation in a pivot bearing 56 about an axis parallel to a transverse axis of the tandem road roller. The pivot bearing 56 consists substantially of two mounting plates 57,58, which are spaced from and parallel to each other and are affixed on the bottom side of the bottom of the operator's platform, and which are connected through pivot bolts 59 and 60, respectively, with associated brackets 61 and 62, respectively, on opposite sides of the first arm 46. The mounting plates 57,58 and the brackets 61,62 are angularly offset by 90° relative to the plates 44,45, which form the second arm 43. The pivot bolts 59,60 are screwed into threaded bores in the mounting plates 57,58 and have non-threaded ends, which are mounted in sliding bearings 63,64, which are set-in into the brackets 61,62. A low-wear friction disc 65 is interposed between the mounting plate 57 and the bracket 61. A washer 66 and a cup spring 66 are interposed between the mounting plate 58 and the bracket 62, the cup spring 66 being tensioned by means of a nut 68 on the pivot bolt 66, whereby the pivot bearing 56 is self-locking.

The control stick 6 can be tilted to the left or to the right side of the operator's platform by rotating the upper portion 40 with the second arm 43 in the sliding bearing 48 against the action of the self-locking means 50, which represent a safeguard against unintentional displacement. To adjust the travel speed, the control stick 6 can be rotated by rotation of the first arm in the pivot bearing 56 about an axis, which is perpendicular to the pivot axis of the second arm, this rotation being also effected against the action of self-locking means as a safeguard against unintentional displacement. Thus the control stick 6 is retained in its adjusted speed control position and in its lateral position in which it is required for the control of the travel speed during edge work.

Figure 6:
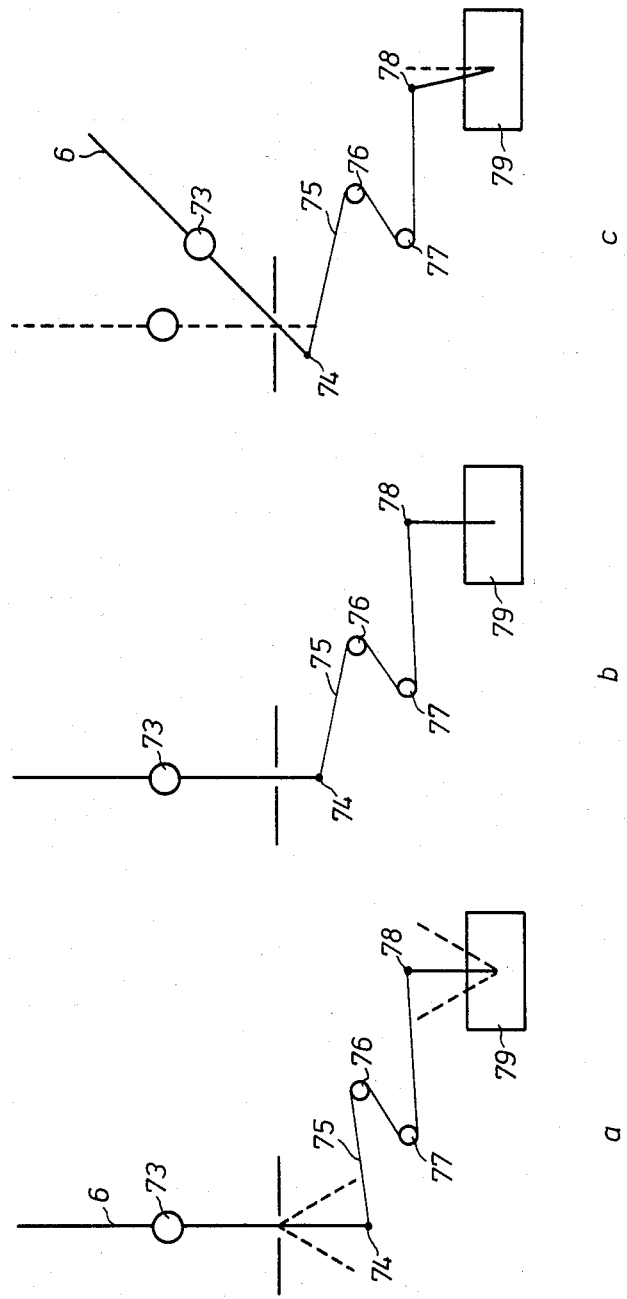
FIG. 6 is a schematic illustration of the mode of operation of the step-down device of the control stick of FIG. 4.

A step-down device 70 is provided on the side of the control stick 6 facing the operator. This step-down device 70 comprises a sleeve 71, which extends along part of the upper portion 40 and the pivot device 42, and which contains a sliding body 72. One end of the sliding body 72 is connected with a first Bowden cable, which can be adjusted in the sleeve 71 by means of a hand wheel on the upper portion of the control stick 6. The other end of the sliding body 72 protudes from the sleeve 71 below the pivot bearing 56 and is provided with a holder 74 for a second Bowden cable 75. The second Bowden cable 75 is guided by deflection devices 76,77 to a displacement control element 78 of a variable displacement supply pump of the hydraulic travel drive of the tandem road roller (see FIG. 6). In the position illustrated in FIG. 5, the sliding body 72 is in a first extreme position, in which it is retracted into the sleeve 71 with the exception of the holder 74. By actuation of the hand wheel 73 the sliding body 72 is progressively displaced within the sleeve 71 towards its other extreme position, in which the holder 74 is farthest away from the end of the sleeve 71. Because of this displacement of the sliding body 72, the adjustment range of the displacement control element 78 is varied. The situations are illustrated schematically in FIG. 6.

In FIG. 6a the control stick 6 and the displacement control element 78 are shown in their neutral positions. The sliding body 72 is in its fully extended position. With this adjustment of the sliding body 72, the displacement control element 78 is taken along with the first arm 46 through the Bowden cable 75 over the whole range of adjustment of the displacement control element 78, when the first arm 46 is rotated. There is no step-down between the control stick 6 and the variable displacement pump 79, as has been indicated by the dashed lines. FIG. 6b shows the sliding body 72 in its partially retracted position, also in the neutral position of the control stick 6 and of the displacement control element 78. When the control stick 6 is rotated by means of the first arm 46, the step-down device 70 will become effective (see FIG. 6c), in that, with unchanged range of adjustment of the control stick 6 the range of adjustment of the displacement control element 78 is reduced. The more the sliding body 72 is retracted into the sleeve 71, the more is the range of adjustment of the displacement control element 78 reduced. Thus the adjustment of the travelling speed by means of the control stick 6 becomes correspondingly more sensitive. Thereby a more accurate and bump-free control of the travel of the tandem road roller is achieved.

As a safeguard against contamination of the control stick 6, the control stick may be enclosed by a flexible collar, which is attached to the bottom of the operator's platform.

The arrangement of the operator's seats 3,3' on the operator's platform and the lateral tilting of the steering device 5 described hereinbefore and of the control stick 6 described hereinbefore make it possible that these control elements of the tandem road roller can always be positioned within easy reach of the operator and the tandem road roller can be operated always under the operator's close control, in particular during edge and seam work, with working attitudes, which are ergonomically equally favorable for the operator.

We claim:

1. Operator's seat and controls arrangement for a tandem road roller with roller barrels comprising an operator's platform with two operator's seat (3,3'), two steering device (5) and a control stick (6), characterized in that
   (a) the operator's seats (3,3') are mounted side by side for rotation substantially on the transverse center line of the operator's platform and in the plane of the respective barrel edges,
   (b) the steering devices (5) are mounted on opposite transverse sides of the driver's platform substantially on the longitudinal center plane of the operator's platform and pivotable about an axis extending in said center plane such that each said steering device may be pivoted through said center plane to be accessible from either of said operator's seats, and
   (c) said control stick (6) is arranged in the middle between the operator's seats (3,3').

2. Arrangement as claimed in claim 1, characterized in that the axis of rotation of each operator's seat (3,3') intersects the center of the longitudinal center line of the operator's seat.

3. Arrangement as claimed in claim 1, characterized in that
   (a) said steering device (5) comprises a steering wheel (10) and a steering column (11) through which the steering wheel (10) is in driving connection with a steering shaft (14) and a hydraulic steering booster,
   (b) said steering column (11) has a pivot sleeve (18) at its end remote from the steering wheel (10) and rotatable about said steering shaft (14), and
   (c) said pivot sleeve (18) is rotatable against the action of self centering means (21) and is arranged to be locked in a center position and at least two lateral positions.

4. Arrangement as claimed in claim 3, characterized in that
   (a) the pivot sleeve (18) is mounted for rotation on the outer surface of a bushing (16) surrounding the steering shaft (14) and having an end face remote from said steering column and
   (b) said self-centering means (21) comprises a bolt (20) attached to the end face of the pivot sleeve (18) remote from the steering column (11), and a spring loaded cable means (22) the free end of which is secured to the free end of the bolt (20).

5. Arrangement as claimed in claim 4, characterized in that
   (a) said pivot sleeve (18) extends along only part of the length of said bushing (16),
   (b) said bushing (16) carries a holding plate (27) at its end face remote from said steering column (11), said holding plate having a side facing said pivot sleeve (18), (c) a locking bolt (32) passing through said steering column (11) and said pivot sleeve (18) is provided, and (d) said holding plate (27) has grooves (31) on its side facing said pivot sleeve (18) for engagement of said locking bolt (32) in accordance with the respective desired position of the steering column.

6. Arrangement as claimed in claim 5, characterized in that (a) said holding plate (27) is arranged centered with respect to said steering shaft (14) and has a substantially semicircular, arcuate projection (30) extending over said bushing (16) and provided, on said side facing said pivot sleeve (18), with said grooves (31), which are radial with respect to said steering shaft (14), and (b) limiting stops are formed on both sides of said projection (30) for limiting the rotary movement of said pivot sleeve (18).

7. Arrangement as claimed in claim 1, characterized in that said control stick (6) is mounted on a pivot device (42) permitting pivoting of said control stick in two mutually orthogonal directions.

8. Arrangement as claimed in claim 7, characterized in that said pivot device (42) comprises a first arm (46), which is pivotable about an axis parallel to the transverse axis of the tandem road roller, and a second arm (43) which is pivoted on said first arm (46) about an axis parallel to the longitudinal axis of said tandem road roller, said first arm (46) being operatively connected to speed control means (78) for controlling the speed of the road roller.

9. Arrangement as claimed in claim 8, characterized in that (a) said second arm (43) comprises two spaced parallel plates (44,45), which have one end affixed to an upper portion (40) of said control stick (6), (b) said plates (44,45), at their ends remote from said upper portion (40), extend over a first end of said first arm (46) and are interconnected by a pivot bolt (42), which passes through a sliding bearing (48) provided in said first end of said first arm (46), and (c) one of said plates (44) has a projecting portion (51) and a self-locking means (50) engages said projecting portion (51).

10. Arrangement as claimed in claim 9, characterized in that said first arm (46) has a second end, which is mounted for rotation in a self-locking pivot bearing means (56).

11. Arrangement as claimed in claim 10, characterized in that said pivot bearing means (56) comprises (a) two spaced, parallel brackets (61,62) at said second end of said first arm (46) and angularly offset by 90° with respect to said second arm (43) and having sliding bearings (63,64) lodged therein, (b) pivot bolts (59,60) passing through said brackets (61,62) and sliding bearings (63,64), (c) spaced, parallel mounting plates (57,58) projecting from said operator's platform and accommodating said pivot bolts (59,60), and (d) a biased cup spring (62) arranged between one of said mounting plates (58) and the adjacent one of said brackets (62).

12. Arrangement as claimed in claim 7, characterized in that said control stick (6) is operatively connected with speed control means (78) through an adjustable step-down device (70).

13. Arrangement as claimed in claim 12, characterized in that said step-down device comprises (a) a sleeve (71) extending along said control stick (6) and said pivot device (42), (b) a sliding body (72) slideably movable along said sleeve (71) and having first and second ends, said second end protruding beyond said pivot device (42)

(c) a hand wheel (73) mounted on said control stick (6), (d) a first Bowden cable interconnecting said hand wheel (73) and said first end of said sliding body (72), and (e) a second Bowden cable (75) attached to said second end of said sliding body (72) and engaging said speed control means (78).

14. Arrangement as claimed in claim 13, characterized in that said speed control means is the displacement control element (78) of a variable displacement pump.

* * * * *